United States Patent
Kanatani et al.

(10) Patent No.: US 7,753,260 B2
(45) Date of Patent: Jul. 13, 2010

(54) INFORMATION PROCESSING SYSTEM, INFORMATION PROCESSING METHOD, PROGRAM, AND RECORDING SYSTEM

(75) Inventors: Ryogo Kanatani, Tokyo (JP); Yasuhiko Mori, Machida (JP)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/023,602

(22) Filed: Dec. 29, 2004

(65) Prior Publication Data

US 2006/0065707 A1    Mar. 30, 2006

Related U.S. Application Data

(60) Provisional application No. 60/614,435, filed on Sep. 29, 2004.

(51) Int. Cl.
G06K 5/00      (2006.01)
G06F 3/048     (2006.01)

(52) U.S. Cl. ........................................ 235/380; 715/765

(58) Field of Classification Search ................. 235/380, 235/375; 715/765, 744, 866, 747
See application file for complete search history.

(56) References Cited

U.S. PATENT DOCUMENTS

| | | | | |
|---|---|---|---|---|
| 5,493,105 A | | 2/1996 | Desai | 235/375 |
| 5,732,229 A | | 3/1998 | Dickinson | 395/334 |
| 5,774,117 A | * | 6/1998 | Kukkal et al. | 715/753 |
| 5,852,807 A | | 12/1998 | Skarbo et al. | 705/7 |
| 6,157,954 A | | 12/2000 | Moon et al. | 709/228 |
| 6,175,741 B1 | | 1/2001 | Alperovich | 455/458 |
| 6,195,686 B1 | | 2/2001 | Moon et al. | 709/206 |
| 6,254,001 B1 | * | 7/2001 | Chan | 235/380 |
| 6,397,219 B2 | | 5/2002 | Mills | 1/1 |
| 6,442,263 B1 | * | 8/2002 | Beaton et al. | 379/142.04 |
| 6,533,171 B1 | | 3/2003 | Porter | 235/380 |
| 6,816,725 B1 | | 11/2004 | Lemke et al. | 455/414.1 |
| 6,857,072 B1 | | 2/2005 | Schuster et al. | 713/160 |
| 6,868,426 B1 | | 3/2005 | Mankoff | 707/104.1 |
| 6,873,861 B2 | | 3/2005 | Awada et al. | 455/566 |
| 6,888,927 B1 | | 5/2005 | Cruickshank et al. | 379/88.11 |
| 6,889,213 B1 | | 5/2005 | Douvikas et al. | 705/67 |
| 6,954,934 B2 | | 10/2005 | Kumar | 719/317 |
| 7,003,546 B1 | | 2/2006 | Cheah | 709/200 |
| 7,007,068 B2 | | 2/2006 | Morkel | 709/206 |
| 7,017,109 B1 | | 3/2006 | Douvikas et al. | 715/501.1 |
| 7,039,869 B2 | | 5/2006 | Smith | 715/716 |
| 7,043,531 B1 | | 5/2006 | Seibel et al. | 709/206 |
| 7,047,041 B2 | | 5/2006 | Vänskä et al. | 455/558 |

(Continued)

OTHER PUBLICATIONS

PCT, International Search Report, Jul. 27, 2007, pp. 7.

(Continued)

*Primary Examiner*—Daniel A Hess
(74) *Attorney, Agent, or Firm*—Merchant & Gould, P.C.

(57) ABSTRACT

A novel information processing system, information processing method, program, and recording medium related to electronic business cards are provided. An information processing system for generating data of an electronic business card, stores personal information, and stores one or more presentation method data. Each of the presentation method data specifies a method for presenting the personal information in the electronic business card. The information processing system generates the data of the electronic business card by using the personal information and one of the presentation method data, when an instruction to use the data of the electronic business card is inputted.

18 Claims, 8 Drawing Sheets

U.S. PATENT DOCUMENTS

| | | | | |
|---|---|---|---|---|
| 7,109,985 | B2 | 9/2006 | Spencer et al. | 345/418 |
| 7,246,099 | B2 | 7/2007 | Feldhahn | 705/65 |
| 7,255,267 | B2 | 8/2007 | Chao | 235/380 |
| 7,280,975 | B1 | 10/2007 | Donner | 705/10 |
| 7,289,110 | B2 | 10/2007 | Hansson | 345/173 |
| 7,322,007 | B2 | 1/2008 | Schowtka et al. | 715/513 |
| 7,337,127 | B1 | 2/2008 | Smith et al. | 705/14 |
| 7,387,234 | B2 | 6/2008 | Kanatani et al. | 235/375 |
| 7,451,099 | B2 | 11/2008 | Henkin et al. | 705/14 |
| 7,483,179 | B2 | 1/2009 | Stumbo et al. | 358/402 |
| 7,607,084 | B2 | 10/2009 | Malone et al. | 715/255 |
| 2001/0027472 | A1 | 10/2001 | Guan | 709/203 |
| 2002/0013815 | A1 | 1/2002 | Obradovich et al. | 709/204 |
| 2002/0035566 | A1 | 3/2002 | Rugg | 707/100 |
| 2002/0055955 | A1 | 5/2002 | Lloyd-Jones et al. | 707/512 |
| 2002/0107938 | A1 | 8/2002 | Moroney et al. | 709/218 |
| 2002/0116396 | A1 | 8/2002 | Somers et al. | 707/200 |
| 2002/0130185 | A1 | 9/2002 | LaForge et al. | 235/487 |
| 2002/0133482 | A1 | 9/2002 | Wen Hung | 707/3 |
| 2002/0138633 | A1 | 9/2002 | Angwin et al. | 709/229 |
| 2002/0152086 | A1 | 10/2002 | Smith et al. | 705/1 |
| 2002/0188606 | A1* | 12/2002 | Sun et al. | 707/10 |
| 2003/0020959 | A1 | 1/2003 | Henry | 358/402 |
| 2003/0050920 | A1 | 3/2003 | Sun | 707/2 |
| 2003/0066877 | A1* | 4/2003 | Howard et al. | 235/380 |
| 2003/0131001 | A1 | 7/2003 | Matsuo | 707/9 |
| 2003/0158893 | A1 | 8/2003 | Komatsu et al. | 709/203 |
| 2003/0163705 | A1* | 8/2003 | Richards et al. | 713/182 |
| 2004/0019521 | A1 | 1/2004 | Birmingham | 705/14 |
| 2004/0076345 | A1 | 4/2004 | Olszak et al. | 382/309 |
| 2004/0153328 | A1 | 8/2004 | Macholda | 705/1 |
| 2004/0181517 | A1 | 9/2004 | Jung et al. | 707/3 |
| 2004/0181540 | A1 | 9/2004 | Jung et al. | 707/100 |
| 2004/0207878 | A1 | 10/2004 | Ferlitsch | 358/2.1 |
| 2004/0243496 | A1 | 12/2004 | Kim et al. | 705/35 |
| 2004/0243930 | A1 | 12/2004 | Schowtka et al. | 715/513 |
| 2005/0091074 | A1 | 4/2005 | Feldhahn | 705/1 |
| 2005/0103838 | A1 | 5/2005 | Slotkin et al. | 235/380 |
| 2005/0113025 | A1 | 5/2005 | Akamatsu et al. | 455/41.3 |
| 2005/0122543 | A1 | 6/2005 | Walker | 358/1.18 |
| 2005/0165621 | A1 | 7/2005 | Lapstun et al. | 705/1 |
| 2005/0182644 | A1 | 8/2005 | Douvikas et al. | 705/1 |
| 2005/0239439 | A1 | 10/2005 | Manabe | 455/410 |
| 2005/0289474 | A1* | 12/2005 | Master et al. | 715/765 |
| 2006/0075050 | A1 | 4/2006 | Kanatani et al. | 709/206 |
| 2006/0075231 | A1 | 4/2006 | Yu et al. | 713/168 |
| 2006/0088214 | A1 | 4/2006 | Handley et al. | 382/176 |
| 2006/0184574 | A1 | 8/2006 | Wu et al. | 707/104.1 |
| 2006/0229988 | A1 | 10/2006 | Oshima et al. | 705/50 |
| 2006/0293903 | A1 | 12/2006 | Ramanathan et al. | 705/1 |
| 2006/0293904 | A1 | 12/2006 | Ramanathan et al. | 705/1 |
| 2006/0293905 | A1 | 12/2006 | Ramanathan et al. | 705/1 |
| 2009/0216389 | A1 | 8/2009 | Yokoyama et al. | 709/206 |

OTHER PUBLICATIONS

PCT, International Search Report. Aug. 15, 2007, pp. 7.
U.S. Office Action mailed Mar. 31. 2008 in U.S. Appl. No. 11/159,837.
U.S. Office Action mailed Apr. 7, 2008 in U.S. Appl. No. 11/159,838.
U.S. Office Action mailed Oct. 26. 2007 in U.S. Appl. No. 11/023,614.
U.S. Final Office Action mailed Jun. 16, 2008 in U.S. Appl. No. 11/023,614.
U.S. Office Action mailed May 13, 2008 in U.S. Appl. No. 11/023,617.
U.S. Office Action mailed Nov. 6, 2006 in U.S. Appl. No. 11/023,612.
U.S. Office Action mailed Apr. 19, 2007 in U.S. Appl. No. 11/023,612.
U.S. Final Office Action mailed Sep. 25, 2007 in U.S. Appl. No. 11/023,612.
PCT, Application No. PCT/US2006/25574, International Search Report, Mar. 29, 2007, pp. 9.
U.S. Final Office Action mailed Dec. 3, 2008 in U.S. Appl. No. 11/159,837.
U.S. Final Office Action mailed Jan. 16, 2009 in U.S. Appl. No. 11/159,838.
U.S. Office Action mailed Jan. 21, 2009 in U.S. Appl. No. 11/023,614.
U.S. Office Action mailed May 14, 2009 in U.S. Appl. No. 11/159,837.
U.S. Office Action mailed Mar. 24, 2009 in U.S. Appl. No. 11/159,840.
U.S. Office Action mailed Jun. 8, 2009 in U.S. Appl. No. 11/023,617.
U.S. Final Office Action mailed Aug. 7, 2009 in U.S. Appl. No. 11/023,614.
(1997) vCard: The Electronic Business Card:; Version 2.1; A versit Consortium White Paper; http://www.imc.org/pdi/vcardwhite.ht.; Jan. 1997.
U.S. Final Office Action mailed Jan. 27, 2010 in U.S. Appl. No. 11/023,617.
U.S. Final Office Action mailed Mar. 15, 2010, in U.S. Appl. No. 11/159,840.
U.S. Office Action mailed Apr. 2, 2010, in U.S. Appl. No. 11/917,673.
U.S. Final Office Action mailed Oct. 15, 2009, in U.S. Appl. No. 11/159,840.
U.S. Final Office Action mailed Dec. 3, 2009 in U.S. Appl. No. 11/159,837.
U.S. Office Action mailed Dec. 15, 2009 in U.S. Appl. No. 11/023,614.

* cited by examiner

EDITING PERSONAL INFORMATION

NAME (N): YASUHIKO ○○○

PHOTO

Tabs: COMPANY | HOME | OTHER | DETAILED INFORMATION | ADDITIONAL INFORMATION

ZIP CODE (Z): ○○○-△△△△

ADDRESS (R): AAAA△△△△

COMPANY (C): △△△△····△△LIMITED

DEPARTMENT 1 (D): OFFICE DEVELOPMENT GROUP

DEPARTMENT 2 (E): ○○○××GROUP

JOB (J): PROGRAM MANAGER

TELEPHONE (COMPANY): ○○○-○○-○○○○
FACSIMILE (COMPANY):
E-MAIL (COMPANY): ccc@ddd.com
HOMEPAGE (COMPANY): http://www.bbbb.com

[OK] [CANCEL]

CONTENTS TO BE SENT

△△△△·····△△LIMITED
OFFICE DEVELOPMENT GROUP
PROGRAM MANAGER
Yasuhiko ○○○
○○○○
AAAA△△△△
E-MAIL (COMPANY) : cccc@ddd.com
TELEPHONE (COMPANY) : ○○○-○○-○○○○
HOMEPAGE (COMPANY) : http://www.bbbb.com

INFORMATION CONTAINED IN THIS BUSINESS CARD

NAME [Yasuhiko ○○○]
...

SENDING INFORMATION

ADDRESS eee@fff.com

SEND

INFORMATION PROCESSING SYSTEM, INFORMATION PROCESSING METHOD, PROGRAM, AND RECORDING SYSTEM

The present invention claims priority to U.S. provisional patent application Ser. No. 60/614,435 filed Sep. 29, 2004, and incorporated herein in its entirety.

BACKGROUND OF THE INVENTION

1. Field of the Invention

The present invention relates to an information processing system, information processing method, program, and recording medium related to electronic business cards.

2. Description of the Related Art

Instead of giving another person a business card in a paper form, personal information including a name, an organization name, a telephone number, etc., described in the business card is brought to other person by using an electronic mail through the Internet. As a data format of the business card information used in Internet communications, RFC (Request for Comments) 2426 "vCard MIME Directory Profile" is known.

However, there is room for improvement for such electronic business cards.

SUMMARY OF THE INVENTION

It is an object of the present invention to provide a novel information processing system, information processing method, program, and recording medium related to electronic business cards.

According to a first aspect of the present invention, an information processing system is an information processing system for generating data of an electronic business card, comprising: means for storing personal information; means for storing one or more presentation method data, each of the presentation method data specifies a method for presenting the personal information in the electronic business card; means for inputting an instruction to use the data of the electronic business card; and means for generating the data of the electronic business card by using the personal information and one of the presentation method data, when the instruction is inputted.

According to a second aspect of the present invention, an information processing method is an information processing method in an information processing system for generating data of an electronic business card, the information processing system comprising means for storing personal information and means for storing one or more presentation method data, each of the presentation method data specifies a method for presenting the personal information in the electronic business card, the information processing method comprising the steps of: inputting an instruction to use the data of the electronic business card; and generating the data of the electronic business card by using the personal information and one of the presentation method data, when the instruction is inputted.

According to a third aspect of the present invention, a program is a program for causing an information processing system for generating data of an electronic business card to execute an information processing method, the information processing system comprising means for storing personal information and means for storing one or more presentation method data, each of the presentation method data specifies a method for presenting the personal information in the electronic business card, the information processing method comprising the steps of: inputting an instruction to use the data of the electronic business card; and generating the data of the electronic business card by using the personal information and one of the presentation method data, when the instruction is inputted.

According to a fourth aspect of the present invention, a recording medium is a recording medium recording the above-mentioned program.

According to the present invention, a novel information processing system, information processing method, program, and recording medium related to electronic business cards can be provided.

The above and other objects, effects, features and advantages of the present invention will become more apparent from the following description of embodiments thereof taken in conjunction with the accompanying drawings.

BRIEF DESCRIPTION OF THE DRAWINGS

FIG. 3 is a diagram showing an example of a screen for editing personal information;

FIG. 6 is a diagram showing an example of a displayed screen when a user wants to transmit an electronic business card;

DESCRIPTION OF THE PREFERRED EMBODIMENTS

Hereinafter, an embodiment of the present invention will be described in detail with reference to the drawings.

Figure 1:
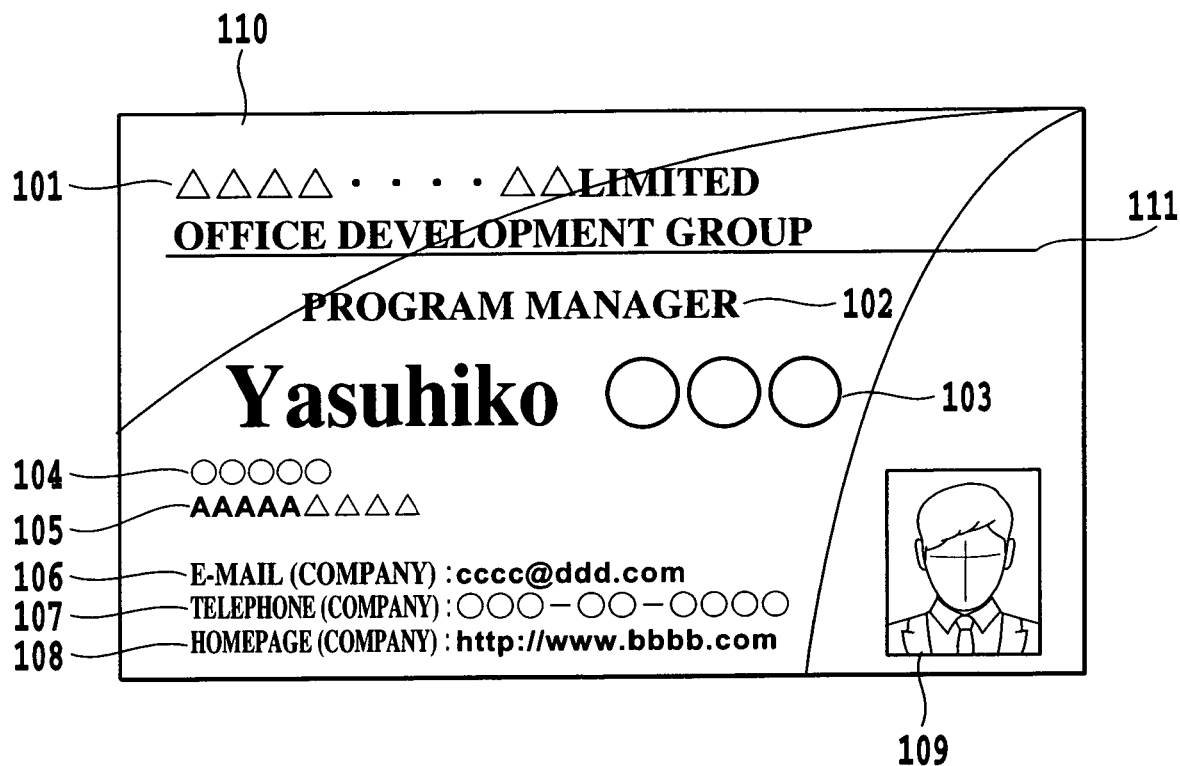
FIG. 1 is a diagram showing an example of an electronic business card.

FIG. 1 is a diagram showing an example of an electronic business card. In the example of FIG. 1, the electronic business card includes a company name 101, a title 102, a personal name 103, a zip code 104, a company address 105, a company e-mail address 106, a company telephone number 107, a company homepage URL address 108, a facial photo (image) 109, a background image 110, and a line 111.

Figure 2:
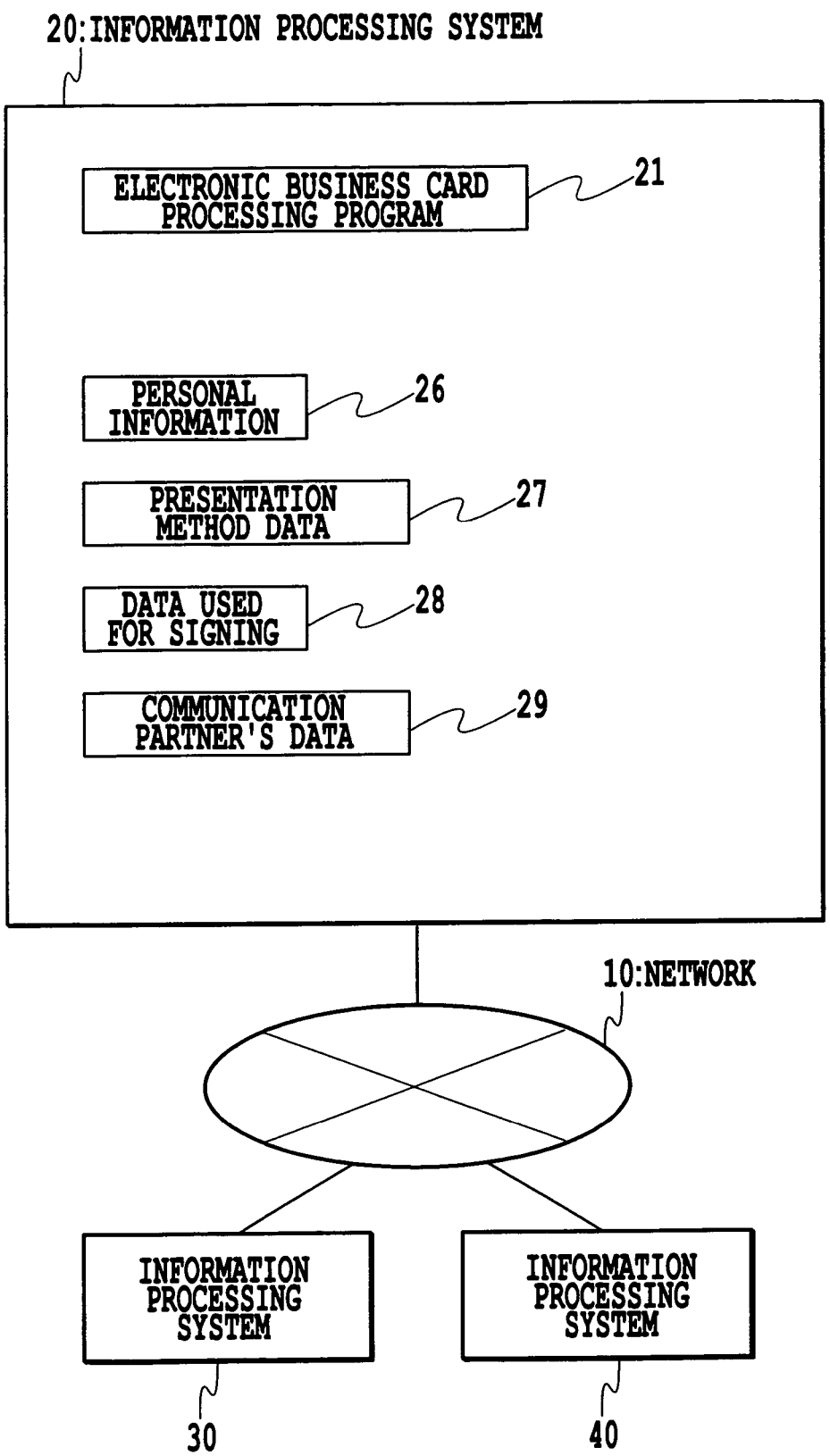
FIG. 2 is a diagram showing an example of a communication system in an embodiment of the present invention.

FIG. 2 is a diagram showing an example of a communication system in the present embodiment. In FIG. 2, information processing systems 20, 30, and 40 can be provided as, for example, personal computers possessed by respective users. As the information processing systems 20, 30, and 40, for example, portable telephones or combinations of portable telephones and personal computers can also be considered. By using the information processing system, each user can transmit and receive electronic business card data with respect to other information processing systems via a network 10. At the information processing system, an electronic business card can be displayed, printed, and so on as shown in FIG. 1 based on the electronic business card data. In the network 10, a public network, the Internet, a mobile communication network and the like can be included.

Hereinafter, although description will be given mainly of the information processing system 20, the same applies to the information processing systems 30 and 40.

In a storing device (a hard disk or the like) of the information processing system 20, in addition to general programs such as an operating system and a communication program, an electronic business card processing program 21 has been stored. The electronic business card processing program 21 is a program for executing various processes related to electronic business cards. These programs can be recorded on a recording medium such as a CD-ROM, a floppy disk, an optical disk or the like and can be read from such a recording medium.

Also, in the storing device of the information processing system 20, in addition to various data, personal information 26, presentation method data 27, data used for signing 28, and communication partner's data 29 have been stored.

The personal information 26 is information related to an individual (user), in which his/her name, telephone number, e-mail address, homepage URL address, zip code, address, company name, title, facial photo (image) and the like are included. The telephone number, address and the like may be separately provided for his/her company and own house, for example.

The presentation method data 27 is data for specifying a method for presenting the personal information 26 in an electronic business card. In greater detail, the presentation method data 27 specifies an arranging position, a size, a color, a font and the like of information (a character string, image, line or the like) of each item of the personal information.

The presentation method data 27 may be singular or plural, and in the present embodiment, each of the data is managed as a file. From a plurality of presentation method data 27, the user can select one data which he/she wants to adopt.

The presentation method data 27 defines information to be included in an electronic business card. Accordingly, of the personal information 26, items which have not been defined by the presentation method data 27 are not included in the electronic business card. For example, when the presentation method data 27 has not defined a company name, even if a company name is included in the personal information, the company name is not included in the electronic business card.

The presentation method data 27 may be prepared by the user or may employ data prepared by another person (for example, a person in charge of determining a business card design in a company).

By the above personal information 26 and presentation method data 27, contents of the electronic business card can be identified.

The data used for signing 28 is data for placing a signature on an electronic business card. Thereby, falsification of the electronic business card is prevented and the contents of the electronic business card can be certified.

In the present embodiment, a digital signature is employed, and a private key is included in the data used for signing 28. In the present embodiment, electronic business card body data and personal information which will be described later (FIG. 7) are encrypted by using the private key to generate signature data. At a receiving side, presence or absence of a falsification can be found by decrypting the signature data by using a corresponding public key. Here, it is also possible to include a certificate including the public key in the data of the electronic business card and transmit the data to the receiving side.

As in the above, by separating the personal information 26 and the presentation method data 27 (and the data used for signing 28), electronic business cards of different persons can be generated by using the same presentation method data. In addition, repeated management can be avoided. Namely, for example, while each person simultaneously possesses different electronic business cards (designs), it becomes unnecessary to manage his/her personal information for all electronic business cards (the personal information can be managed in one place). In addition, this is effective when a company wants to employ a unified electronic business card design among all employees. In addition, renewal of information concerning the electronic business cards is simplified.

The communication partner's data 29 is data concerning an electronic business card received from another information processing system (for example, the image processing system 30). The data of the received electronic business card may be kept as it is, or out of the received electronic business card data, personal information and the like may be picked out and kept. In addition, if the received electronic business card data includes a public key, this may be picked out and kept.

FIG. 3 is a diagram showing a screen for editing personal information. The electronic business card processing program 21 provides a personal information editing function, and a user can edit, on the screen of FIG. 3, personal information by using a keyboard, a mouse and the like. Namely, the user can add, delete, and change information for each item on the screen of FIG. 3. The facial photo can be changed by, for example, specifying another image file.

Figure 4:
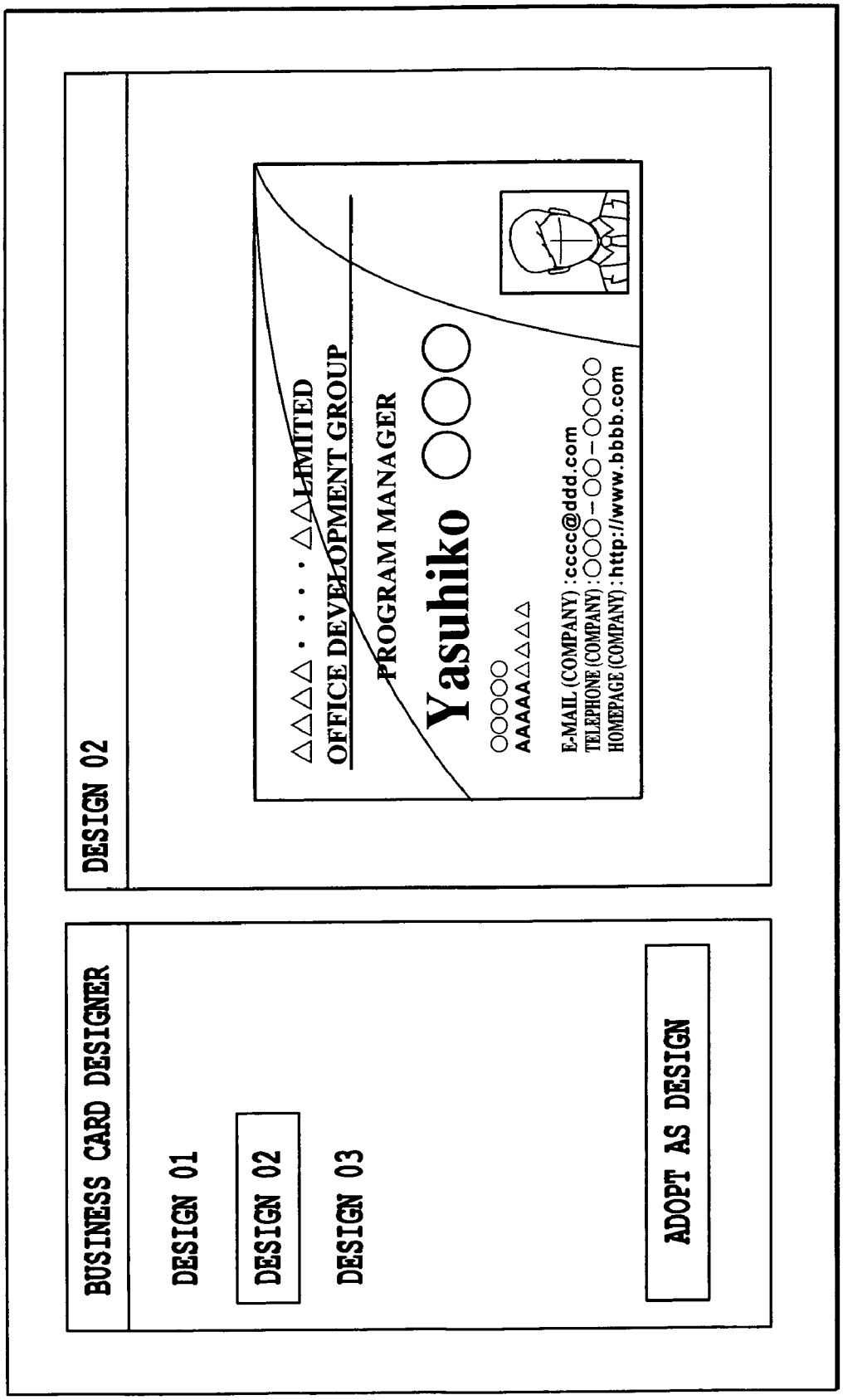
FIG. 4 is a diagram showing an example of a screen for selecting and editing presentation method data.

FIG. 4 is a diagram showing an example of a screen for selecting and editing presentation method data. The electronic business card processing program 21 provides a presentation method data selecting and editing function, and a user can select and edit, on the screen of FIG. 4, presentation method data. In the example of FIG. 4, a "design 01," a "design 02," and a "design 03" exist as presentation method data. If the user selects, for example, the "design 02," an image of an electronic business card is displayed based on the "design 02" and current personal information (see the window entitled "design 02" on the right side of FIG. 4). The user can also see an image of an electronic business card when the "design 01" or the "design 03" is employed. When the user wants to adopt selected presentation method data, it is sufficient that he/she clicks a button "Adopt as a design" with the mouse. Thereafter, an electronic business card is generated by using the selected presentation method data.

On the screen of FIG. 4, the user can also edit the presentation method data. For example, if the user drags and shifts information of an item which he/she wants to edit in the window of the right side of FIG. 4 with a mouse, in that presentation method data ("design 02"), the arrangement position of the item is changed. In addition, by clicking information of an item which he/she wants to edit with the mouth and carrying out a predetermined operation, the size, color, font and the like of the item can be changed.

Once the personal information and adopted presentation method data are determined, the electronic business card can be transmitted.

Figure 5:
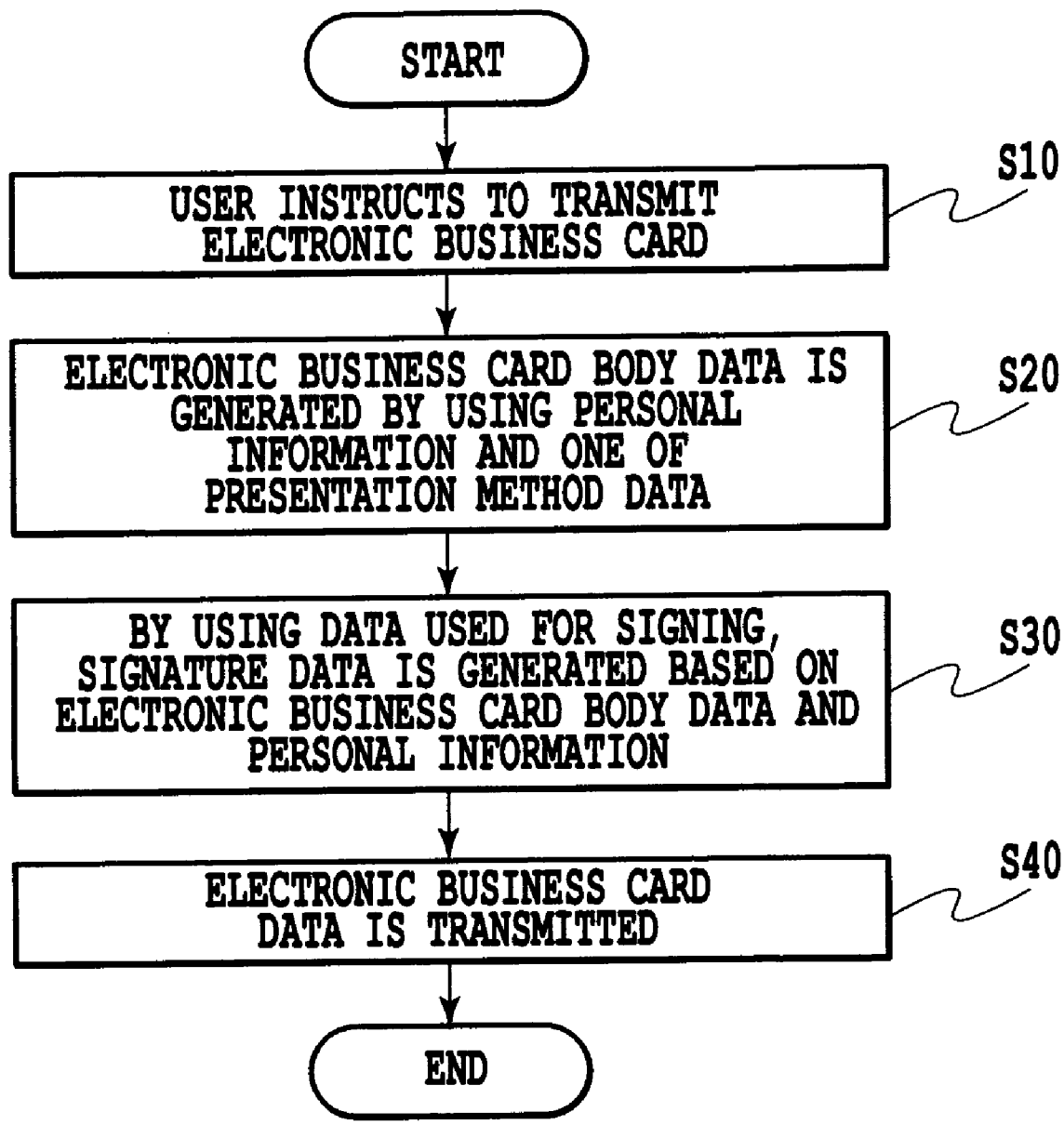
FIG. 5 is a flowchart showing an example of a process executed by an electronic business card processing program when an electronic business card (data) is transmitted to another information processing system.

FIG. 5 is a flowchart showing an example of a process executed by an electronic business card processing program when an electronic business card (data) is transmitted to another information processing system.

FIG. 6 is a diagram showing an example of a displayed screen when a user wants to transmit an electronic business card. On the screen of FIG. 6, an electronic business card based on current personal information and adopted presentation method data is displayed. When a user specifies a destination address to which the electronic business card is transmitted and clicks a "send" button on the display of FIG. 6

(step S10 of FIG. 5), the electronic business card is transmitted toward an information processing system of the destination address.

In the present embodiment, an information processing system (electronic business card processing program) generates, when an instruction to transmit electronic business card data to another information processing system is inputted, data of electronic business card by using the personal information and the adopted presentation method data (steps S20 and S30). In greater detail, it generates electronic business card body data by using the personal information and the adopted presentation method data and generates, by using the data used for signing, signature data based on the electronic business card body data and the personal information. In this way, by generating electronic business card data at the time of transmission, an electronic business card based on the latest personal information, presentation method data, and data used for signing can be transmitted.

Figure 7:
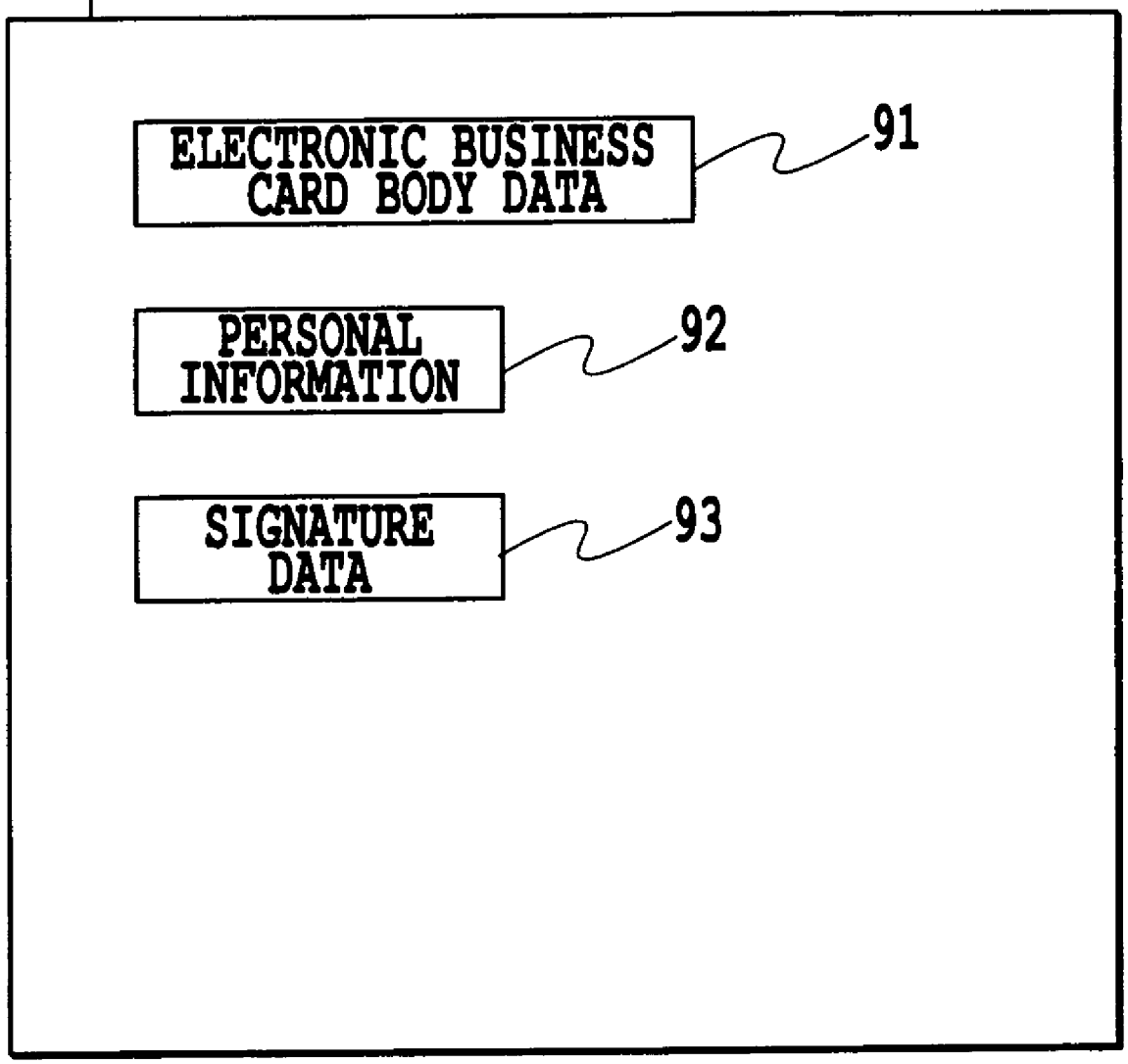
FIG. 7 is a diagram showing an example of data of an electronic business card to be generated.

FIG. 7 is a diagram showing an example of data of an electronic business card to be generated. In the data of the electronic business card 90, electronic business card body data 91, personal information 92, and signature data 93 are included.

The electronic business card body data 91 is data for identifying an electronic business card. For example, the electronic business card body data 91 can be provided with image data itself of an electronic business card identified by personal information and presentation method data. In this case, the personal information cannot be obtained (restored) from this image data. In addition, for the electronic business card body data 91, describing the data by using a language such as a page-description language and whereby making it possible to obtain the personal information can also be considered.

The personal information 92 may be the same as the personal information 26 managed by the information processing system 20, or may be limited to, of the personal information 26, information defined by presentation method data. If such personal information can be obtained from the electronic business card body data 91, the personal information 92 is unnecessary.

The signature data 93 is generated by, as described above, encrypting the electronic business card body data and the personal information by using a private key. The encryption may be carried out by using the whole of the electronic business card body data and the personal information or may be carried out by using a part thereof. In addition, a digest of the whole or a part of the electronic business card body data and the personal information maybe generated and then encrypted. It is also possible to include a certificate including a public key in the data of the electronic business card 90 and transmit the data to the receiving side.

The data of the electronic business card 90 is, after being generated, transmitted to an information processing system of the destination (step S40).

Although, electronic business card data is generated by taking opportunity of an input of an instruction to transmit the electronic business card data to another information processing system in the present embodiment, it is also possible to generate the electronic business card data by taking opportunity of an input of another instruction to use the electronic business card data (for example, an instruction to save the electronic business card data).

In addition, although a signature is placed on an electronic business card in the present embodiment, simplification may be realized by omitting a signature.

Figure 8:
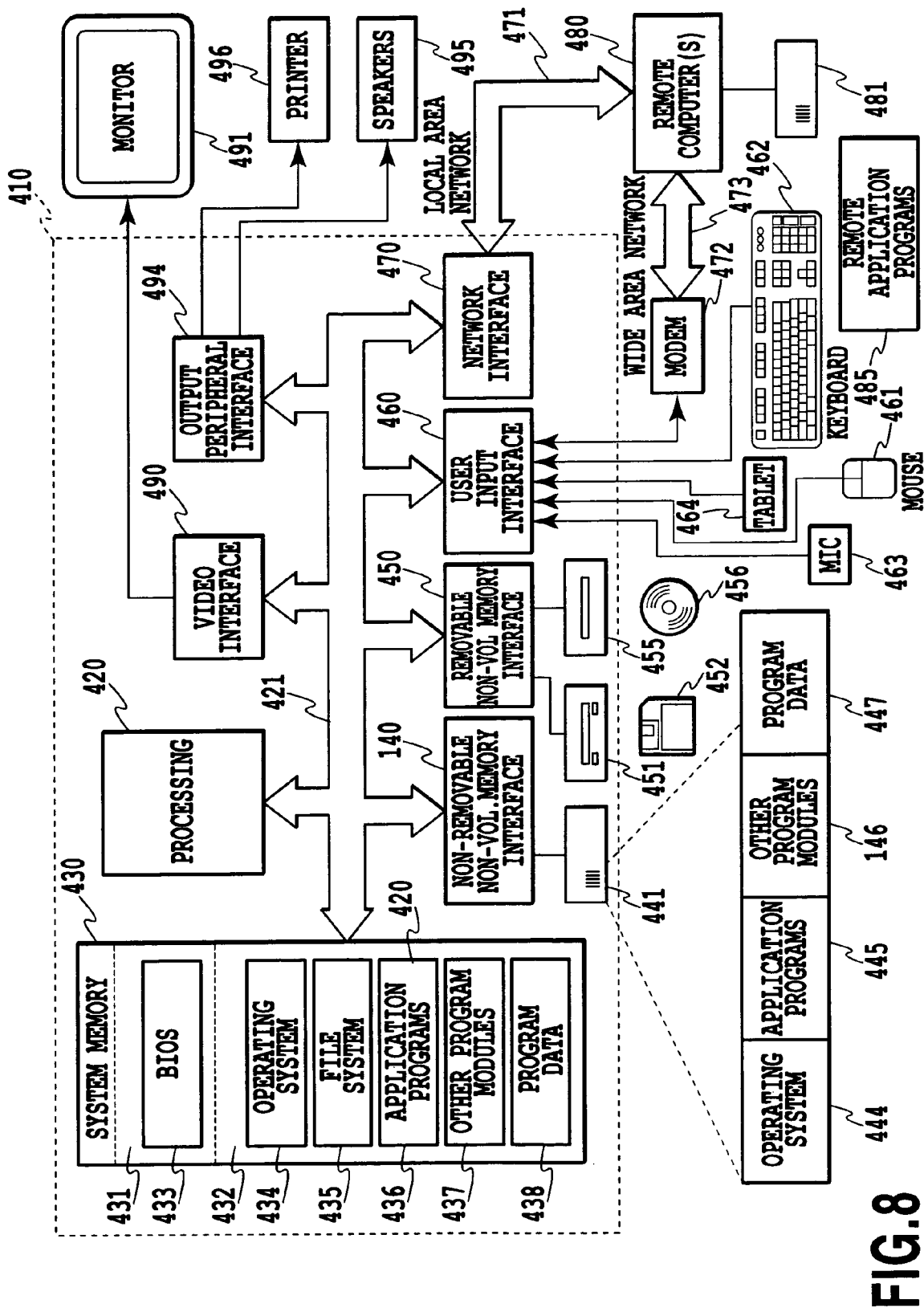
FIG. 8 is a diagram showing an example of an environment to which the present invention is applied.

FIG. 8 is a diagram showing an example of an environment to which the present invention is applied.

In accordance with embodiments of the invention, the methods described herein may be performed on a single, stand-alone computer system but may also be typically performed on multiple computer systems interconnected to form a distributed computer network. An environment 400 for performing processes as contemplated by the present invention is shown in FIG. 8. The environment 400 has a computer system 410, which is considered the primary computer system. As used herein, a "computer system" shall be construed broadly and is defined as "one or more devices or machines that execute programs for displaying and manipulating text, graphics, symbols, audio, video, and/or numbers."

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 8 illustrates operating system 434, application programs 435, other program modules 436 and program data 437.

The computer 410 may also include other removable/non-removable, volatile/nonvolatile computer storage media. By way of example only, FIG. 8 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, discussed above and illustrated in FIG. 8, provide storage of computer-readable instructions, data structures, program modules and other data for the computer 410. In FIG. 8, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet (electronic digitizer) 464, a microphone 463, a keyboard 462 and pointing device 461, commonly referred to as mouse, trackball or touch pad. Other input devices (not shown) may include a joystick, game pad, satellite dish, scanner, or the like. These and other input devices are often connected to the processing unit 420 through a user input interface 460 that is coupled to the system bus, but maybe connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel 493 or the like that can input digitized input such as handwriting into the computer system 410 via an interface, such as a touch-screen interface 492. Note that the monitor and/or touch screen panel can be physically coupled to a housing in which the computing device 410 is incorporated, such as in a tablet-type personal computer, wherein the touch screen panel 493 essentially serves as the tablet 464. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 8. The logical connections depicted in FIG. 8 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. In a networked environment, program modules depicted relative to the computer 410, or portions thereof, may be stored in the remote memory storage device. By way of example, and not limitation, FIG. 8 illustrates remote application programs 485 as residing on memory device 481. It will be appreciated that the network connections shown are exemplary and other means of establishing a communications link between the computers may be used.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A computer-implemented method for generating uniformly formatted electronic business cards in a network, the method comprising:

determining presentation method data for uniform application to business cards users associated with the network, wherein the presentation method data includes a uniform format for electronic business cards in the network;

setting the uniform format for the electronic business cards, wherein electronic business cards generated in the network are confined to the uniform format;

receiving an input instruction to send the electronic business card, and in response to receiving the input instruction, generating business card body data by executing steps comprising: obtaining personal information associated with the user from a personal information data store,
obtaining the uniform format from a presentation method data store, wherein the personal information data store and the presentation method data store are separated such that electronic business cards of different users can be generated using the same uniform format;
determining personal information permitted by the uniform format, and
populating the electronic business card with personal information permitted by the uniform format; and
populating the electronic business card with signature data that is generated before transmission and after the instruction to send the electronic business card; wherein the signature data uses the business card body data and the personal information such that the signature data is based on latest personal information and the uniform format used in generating the electronic business card.

2. The computer-implemented method of claim 1, wherein presentation method data and personal information are stored separately.

3. The computer-implemented method of claim 1, wherein the personal information includes at least one of: a name, a telephone number, an email address, a homepage URL address, a zip code, an address, a company name, a title, and a photograph.

4. The computer-implemented method of claim 1, wherein the presentation method data includes at least one of: an arrangement, a color, a size, a font, a character string and an image.

5. The computer-implemented method of claim 1, wherein the presentation method data includes permitted personal information.

6. The computer-implemented method of claim 1, further comprising populating the electronic business card body data with the personal information that can be extracted from the body data; wherein the body data is described using a page-description language.

7. The computer-implemented method of claim 6, wherein the signature data includes a private key for encrypting the electronic business card.

8. The computer-implemented method of claim 7, wherein the signature data includes a certificate for decrypting the electronic business card.

9. The computer-readable medium of claim 8, wherein the personal information and the uniform format are stored separately.

10. The computer-readable medium of claim 8, wherein the personal information includes at least one of: a name, a telephone number, an email address, a homepage URL address, a zip code, an address, a company name, a title, and a photograph.

11. The computer-readable medium of claim 8, wherein the uniform format includes at least one of: an arrangement, a color, a size, a font, a character string, and an image.

12. The computer-readable medium of claim 8, wherein the uniform format includes permitted personal data.

13. A computer-readable medium having computer executable instructions for providing a uniform format for electronic business cards generated in a networked business environment having a plurality of employees, the computer-executable instructions comprising:

storing personal information associated with a plurality of employees associated with the networked business environment;
determining a uniform format for electronic business cards, wherein the uniform format is centrally managed and access to modify a uniform format store is restricted;
setting the uniform format for the electronic business cards of the networked business environment, wherein electronic business cards generated by the plurality of employees associated with the networked business environment are confined to the uniform format;
upon receiving an input instruction to send an electronic business card from one of the employees of the plurality of employees associated with the networked business environment,
obtaining the uniform format,
accessing the stored personal information, wherein the personal information store and the uniform format are separated such that electronic business cards of different users can be generated using the same uniform format;
determining personal information permitted by the uniform format,
populating the electronic business card with personal information permitted by the uniform format, and
populating the electronic business card with signature data that is generated before transmission and after the instruction to send the electronic business card; wherein the signature data uses business card body data and the personal information such that the signature data is based on latest personal information and the uniform format used in generating the electronic business card.

14. A system providing a uniform format for electronic business cards generated in a networked business environment having a plurality of employees, the system comprising:
a processor; and
a memory having computer-executable instruction stored thereon, the computer-executable instructions including instructions for:
storing personal information associated with a plurality of employees associated with the networked business environment;
determining a uniform format for electronic business cards, wherein the uniform format is centrally managed and access to modify a uniform format store is restricted;
setting the uniform format for the electronic business cards of the networked business environment, wherein electronic business cards generated by the plurality of employees associated with the networked business environment are confined to the uniform format;
upon receiving an input instruction to send an electronic business card from one of the employees of the plurality of employees associated with the networked business environment,
obtaining the uniform format,
accessing the stored personal information, wherein the personal information store and the uniform format are separated such that electronic business cards of different users can be generated using the same uniform format;
determining personal information permitted by the uniform format,
populating the electronic business card with personal information permitted by the uniform format, and populating the electronic business card with signature data that is generated before transmission and after the instruction to send the electronic business card; wherein the signature data uses business card body data and the personal information such that the signature data is based on latest personal information and the uniform format used in generating the electronic business card.

15. The computer-readable medium of claim 14, wherein the personal information and the uniform format are stored separately.

16. The computer-readable medium of claim 14, wherein the personal information includes at least one of: a name, a telephone number, an email address, a homepage URL address, a zip code, an address, a company name, a title, and a photograph.

17. The computer-readable medium of claim 14, wherein the uniform format includes at least one of: an arrangement, a color, a size, a font, a character string, and an image.

18. The computer-readable medium of claim 14, wherein the uniform format includes permitted personal data.

* * * * *